(12) United States Patent
Hüttlin

(10) Patent No.: US 7,168,183 B2
(45) Date of Patent: Jan. 30, 2007

(54) TUNNEL-LIKE APPARATUS FOR TREATING PARTICULATE MATERIAL

(76) Inventor: Herbert Hüttlin, Rümminger Straee 15, 79539 Lörrach (DE)

( * ) Notice: Subject to any disclaimer, the term of this patent is extended or adjusted under 35 U.S.C. 154(b) by 172 days.

(21) Appl. No.: 10/788,428

(22) Filed: Feb. 27, 2004

(65) Prior Publication Data

US 2005/0120583 A1 Jun. 9, 2005

(30) Foreign Application Priority Data

Feb. 28, 2003 (DE) .................... 103 09 989

(51) Int. Cl.
*F26B 17/00* (2006.01)
*F26B 21/00* (2006.01)

(52) U.S. Cl. ................. 34/579; 34/582; 34/588; 34/566; 34/570; 34/168; 34/237; 432/58

(58) Field of Classification Search ............... 34/359, 34/360, 364, 369, 434–436, 487–488, 492, 34/504–506, 509, 566, 570, 579, 582–583, 34/588, 137, 168, 237; 432/15, 58

See application file for complete search history.

(56) References Cited

U.S. PATENT DOCUMENTS 5,093,085 A * 3/1992 Engstrom et al. ............ 422/143

| 5,145,650 A | 9/1992 | Huttlin | .................... 422/143 |
| 6,367,165 B1 | 4/2002 | Huttlin | .................... 34/582 |

FOREIGN PATENT DOCUMENTS

| DE | 40 00 572 C1 | 2/1991 |
| DE | 199 04 147 A1 | 8/2000 |
| RU | 2151988 C1 * | 6/2000 |

* cited by examiner

*Primary Examiner*—Jiping Lu
(74) *Attorney, Agent, or Firm*—St. Onge Steward Johnston & Reens LLC

(57) ABSTRACT

An apparatus for treating particulate material has an elongated, tunnel-like process chamber, along which the material to be treated can be moved from an inlet to an outlet. A bottom of said process chamber is designed in that two flows of introduced process air are oriented transversely with respect to the longitudinal direction and impinge on each other along a breaking-up zone. Arranged in the bottom are air guide elements which can be adjusted by an adjustment device in that the process air can have superimposed on it a variable movement component in the longitudinal direction.

21 Claims, 5 Drawing Sheets

TUNNEL-LIKE APPARATUS FOR TREATING PARTICULATE MATERIAL

This application claims priority of pending German Patent Application No. 103 09 989.1 filed Feb. 28, 2003.

BACKGROUND OF THE INVENTION

The invention relates generally to an apparatus for treating particulate material.

DE 199 04 147 A1 discloses an apparatus for treating particulate material, which comprises a process chamber for holding and for treating the material. A circular cross section bottom of the process chamber comprises mutually overlapping, approximately flat guide plates, between which slots are formed, via which process air can be introduced into the process chamber with a substantially horizontal movement component. In this case, the slots are arranged in such a way that two opposed flows of introduced process air oriented toward each other and running substantially horizontally are produced, impinge on each other along a breaking-up zone and are deflected into a flow oriented substantially vertically upward.

An apparatus of this type is used to dry, to granulate or to coat particulate material.

A gaseous medium, process air, as it is known, is introduced into the process chamber via the bottom, thereby passing through the numerous slots between the mutually overlapping guide plates and entering the process chamber oriented approximately horizontally. In the breaking-up zone, the flows oriented toward each other impinge on each other, are deflected upward, and the process air emerges at the upper end via an exhaust chamber. Because of the force of gravity, the material falls back onto the bottom again, so that a swirling flow circulating approximately circularly develops on either side of the breaking-up zone.

The apparatus mentioned at the beginning has an approximately circular closed bottom, and the process chamber has a cylindrical shape.

Apparatus with a tunnel-like process chamber is also known, what is known as a coating or drying tunnel, in which the material to be treated is not only swirled but is also conveyed gradually from an inlet along the longitudinal direction of the tunnel as far as an outlet. This opens up the possibility of continuous operation.

A fundamental problem in apparatus with tunnel-like elongated process chambers is to transport the swirled material gradually from the inlet to the outlet.

For this purpose, it has become known to arrange the entire apparatus at an angle, so that this transport takes place with the aid of the force of gravity.

Furthermore, it has become known to move the apparatus additionally in the direction of inclination by means of eccentrics or vibrators, in order to assist the movement of the material.

In practical use, it has been established that this is very expensive in terms of apparatus, in particular in the case of large and heavy apparatus. Furthermore, it has been established that the swirled material tends to layer or accumulate during its movement from the inlet to the outlet, that is to say the layer thickness of the swirled material increases toward the outlet.

This is disadvantageous inasmuch as, because of these relatively uncontrollable conditions, non-uniform treatment results are achieved. If the treatment of a particle in the form of a capsule is taken as an example, such as is often found in the pharmaceutical sector, then this capsule arises during the production process as a hollow body, whose interior is filled with the galenic preparation of the medicament, generally in the form of a liquid. The wall of the capsule immediately after the production process is a gel-like, still soft body, which normally has high moisture content. During drying, the intention is for this capsule wall to be dried out by the removal of moisture and, as a result, hardened and solidified. This process is intended to proceed in a controlled manner, that is to say not too quickly and not too slowly; the gel layer dried out gradually is not intended to embrittle and form any cracks, since otherwise there is the danger that the outer layer becomes leaky or separates. Furthermore, the intention is to ensure that the liquid content remains in the interior and does not emerge via the outer layer of the capsule as a result of the drying process.

Thus, as it passes through the elongated tunnel-like process chamber, the capsule layer changes from an initially rather soft, viscous, possibly tacky consistency to a harder, low-moisture, thoroughly dried, solid consistency. The stratification character of the material compound rolled around in the process chamber therefore changes from the inlet to the outlet.

Furthermore, apparatus of this type is intended to permit flexible throughputs, so that, for example, it can be arranged between an apparatus for producing the capsule and a subsequent packaging apparatus, for example blister packing.

It is therefore an object of the present invention to provide an apparatus for treating particulate material comprising an elongated, tunnel-like process chamber which permits a good treatment result with a continuous throughput under reproducible, easily controllable and therefore manageable conditions.

SUMMARY OF THE INVENTION

According to the invention, in an apparatus of this type, the object is achieved in that it contains a bottom which has overlapping guide plates, between which slots extending in the longitudinal direction of the process chamber are formed, through which process air can be introduced into the process chamber in such a way that two flows of introduced process air oriented transversely with respect to the longitudinal direction and oriented oppositely toward each other are produced and impinge on each another along a breaking-up zone, and having air guide elements arranged in the bottom for the process air, which can be adjusted by an adjusting device in such a way that the process air can have superimposed on it a variable movement component in the longitudinal direction.

As the result of the design of the bottom in such a way that two oppositely oriented flows oriented toward each other are produced, which meet each other along a breaking-up zone which extends in the longitudinal direction of the process chamber, an intensive circulating swirling action, and thus an intensive interchange between process air and the material swirled by the latter, can take place on both sides of this breaking-up zone, as viewed in cross section. This is a first important parameter in order to create manageable conditions which ensure the necessary interchange of energy between process air and material to be treated. By means of the adjustable air guide elements, it is now possible to impart to the material swirled in the transverse direction a more or less intense movement component in the longitudinal direction. This second important parameter provides an influence on the residence time of the product particles as they pass through the elongated tunnel-like process chamber. It is therefore not necessary for the entire apparatus to be inclined, shaken or moved in any other way in order to achieve the longitudinal advance; instead this is achieved by means of the movement component which is superimposed by the air guide elements on the process air flowing in.

It is therefore not only possible to consider in a flexible way the material properties of the material respectively to be treated but also the throughput of material, and it is additionally possible for synchronization matching to be achieved between the feeding of the material, for example from a capsule production apparatus, to a packaging apparatus connected downstream. Thus, mechanically simply constructed and easily manageable possibilities are provided for implementing the treatment result in the desired direction. It is possible to achieve identical specific surface values of the treated material, irrespective of whether the material is located at the start or at the end of the tunnel or more at the edge or more centrally.

In a further preferred embodiment of the invention, the air guide elements are arranged between the guide plates.

This measure has the considerable advantage that, precisely at the time at which the process air passes between the air guide elements, the desired movement component is superimposed. Therefore, no additional apparatus or processes connected upstream or downstream is/are necessary; instead, the influence is exerted at the point at which the process air is led through the bottom and into the process chamber. This not only simplifies the construction but also renders unnecessary any bulky structural measures in the actual process chamber.

In a further embodiment of the invention, there are groups of air guide elements, it being possible for each group to be adjusted independently of another one.

This measure increases the flexibility of the process air guidance, that is to say it is possible to select regions which superimpose more or less intense movement components on the process air in the longitudinal direction. This opens up the possibility of producing zones, both in the transverse and in the longitudinal direction, in which the swirled material remains for a longer or shorter time, depending on what is desired.

If reference is made back to the previously mentioned example of drying a freshly produced capsule, then a very high quantity of moisture per unit time initially emerges from the initially highly moisture-containing wall of the capsule while, in a further progressed drying process, this should or can proceed more slowly, in order to rule out cracks and embrittlement, so that, if appropriate, a longer or else a shorter residence time is expedient here, depending on the process management.

In a further embodiment of the invention, one group has a row of guide elements arranged one after another in the longitudinal direction.

This measure has the advantage that, as viewed in the transverse direction, different groups of guide elements can be aligned, so that, for example, a higher movement component can be superimposed in the longitudinal direction in the lateral outer edge regions of the process air introduced than in regions lying further centrally or on the inside, or else vice versa.

In a further embodiment of the invention, the guide elements of a group can be adjusted by a common adjusting element.

This measure has the advantage that this group-wise adjustment can be brought about very simply.

In a further embodiment of the invention, the adjusting elements of all the groups can be adjusted individually and/or jointly via a control system.

This measure has the advantage that, via the control system, it is possible to adapt quite specifically in each case to the material to be treated, in order to achieve an optimum treatment result.

In a further embodiment of the invention, the guide elements are constructed as pivotable guide fingers.

This measure has the advantage that slim structural elements are available, which can be arranged between the guide plates and which, without representing an excessively high flow resistance, can superimpose the desired movement component on the process air introduced, which has a very economical effect in the final analysis.

In a further embodiment of the invention, the guide fingers of a group engage with an actuating rod, whose longitudinal displacement causes them to be pivoted.

This measure has the advantage that the adjustability is effected by mechanically very simple means.

In a further embodiment of the invention, each guide finger can be pivoted about a bearing pin standing between two guide plates.

This measure has the advantage that the pivoting mounting is simple and mechanically stable, and that this bearing pin can be used at the same time as a spacer between two guide plates lying one above another, so that there is a mechanically simple construction.

In a further embodiment of the invention, the actuating rod is comb-like, and teeth of the actuating rod intermesh with a stud bolt of a guide finger.

This measure has the advantage that there is not only a mechanically simple system but also a system which can be disassembled and cleaned simply, which is of great importance in particular when used in the pharmaceutical industry.

In a further embodiment of the invention, below the bottom, there is arranged a feed air box which, as viewed in the longitudinal direction, is subdivided into chambers by transverse walls.

This measure has the advantage that, by means of the chamber-like subdivision, sections are formed which permit quite defined feeding of process air through the bottom. This therefore also rules out the situation in which the process air introduced seeks out the path of low resistance and flows in the feed air box without flowing through the bottom in a defined manner.

In a further embodiment of the invention, air distribution grids are arranged in the chambers.

This measure has the considerable advantage that the process air fed into such a chamber is distributed very uniformly by the air distribution grid and is led to the underside of the bottom and then led through the slots so as to be distributed in a correspondingly defined manner. This likewise contributes to an improvement of the treatment result.

In a further embodiment of the invention, each chamber is provided with an air feed.

This measure has the advantage that further individualization of the air supply and guidance through the bottom is possible.

In a further embodiment of the invention, each chamber can be supplied individually with feed air.

This increases the control possibility still further.

In a further embodiment of the invention, a blower is arranged in each chamber.

This makes it possible, by means of appropriate activation of the blower in interaction with the adjustability according to the invention of the air guide elements, to achieve an optimum treatment result.

If a liquid medium is to be applied to the material in the process chamber, for example during coating, corresponding nozzles for the supply are provided, for example in the walls of the process chamber or in the bottom in the region of the breaking-up zone.

It goes without saying that the features mentioned above and those still to be explained below can be used not only in the respectively specified combination but also in other combinations or on their own Without departing from the scope of the present invention.

BRIEF DESCRIPTION OF THE DRAWINGS

The invention will be described and explained in more detail below using some selected exemplary embodiments in conjunction with the appended drawing, in which.

DETAILED DESCRIPTION OF PREFERRED EMBODIMENTS

Figure 1:
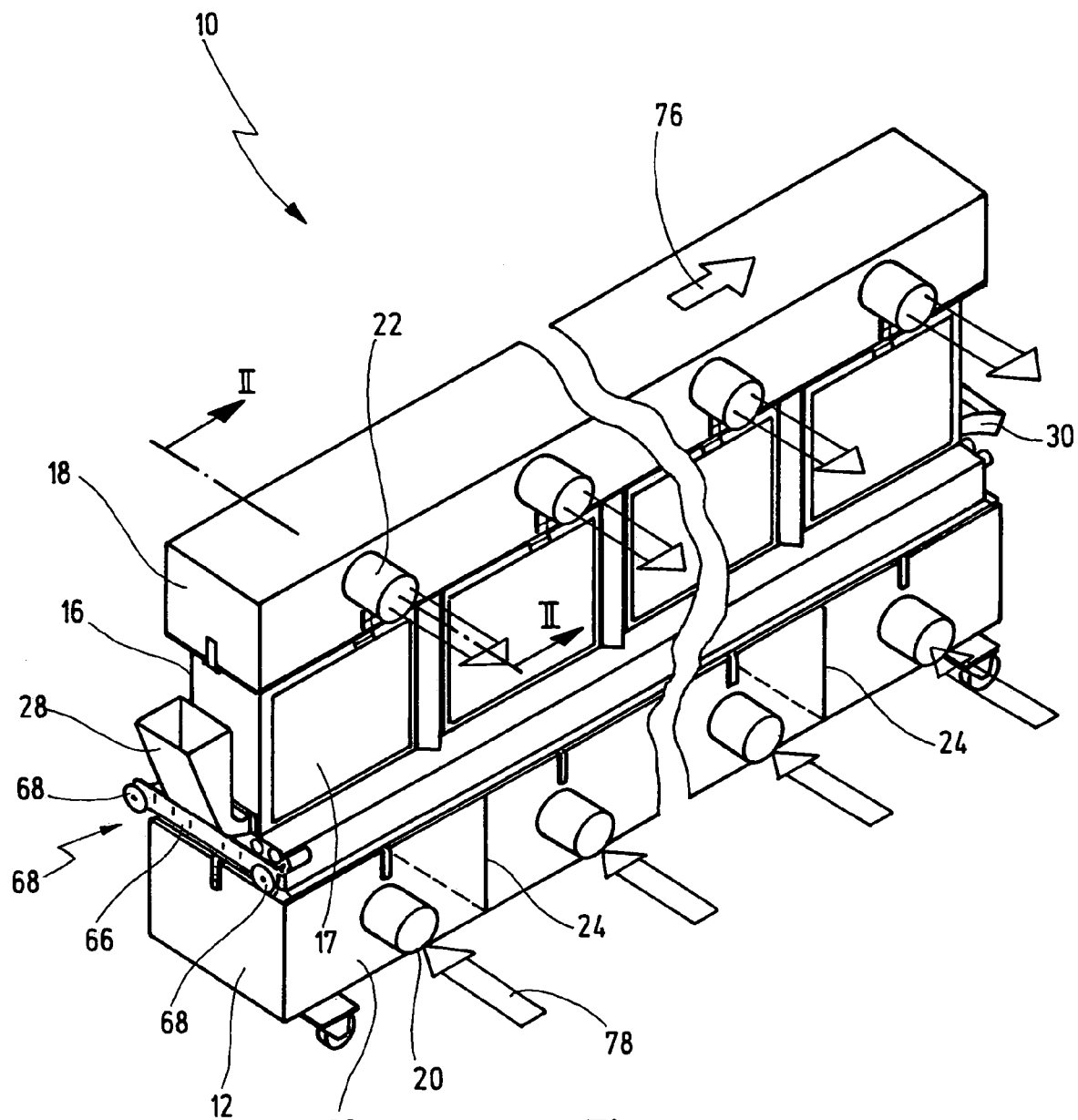
FIG. 1 shows a perspective view of a first exemplary embodiment of an apparatus according to the invention with a tunnel-like process chamber, in highly schematic form.

An apparatus according to the invention, illustrated in FIG. 1, is provided in its entirety with the reference number 10.

The apparatus 10 has a substructure, standing on wheels not specifically designated here, in the form of a feed air box 12. Between two upright side walls 16 and 17, the upper termination of the feed air box 12 forms a bottom 14, which can be seen in particular from FIGS. 2 to 6. Arranged at the upper end of the upright side walls 16 is an exhaust chamber 18. The feed air box 12 is provided with numerous lateral feed air connections 20. The exhaust chamber 18 is provided with a corresponding number of waste air connections 22 at the same height.

Inserted into the feed air box 12 is a plurality of transverse walls 24, so that the feed air box 12 is subdivided into numerous chambers 26.

The end of the apparatus 10 which faces the viewer in FIG. 1 is provided with an inlet 28, to which an inlet funnel is attached.

There is an outlet 30 at the opposite end. In the interior of the apparatus 10 there is therefore an elongated tunnel-like process chamber 31, which is delimited at the lower end by the bottom 14, at the sides by the walls 16 and 17 and at the upper end by the exhaust chamber 18.

Figure 2:
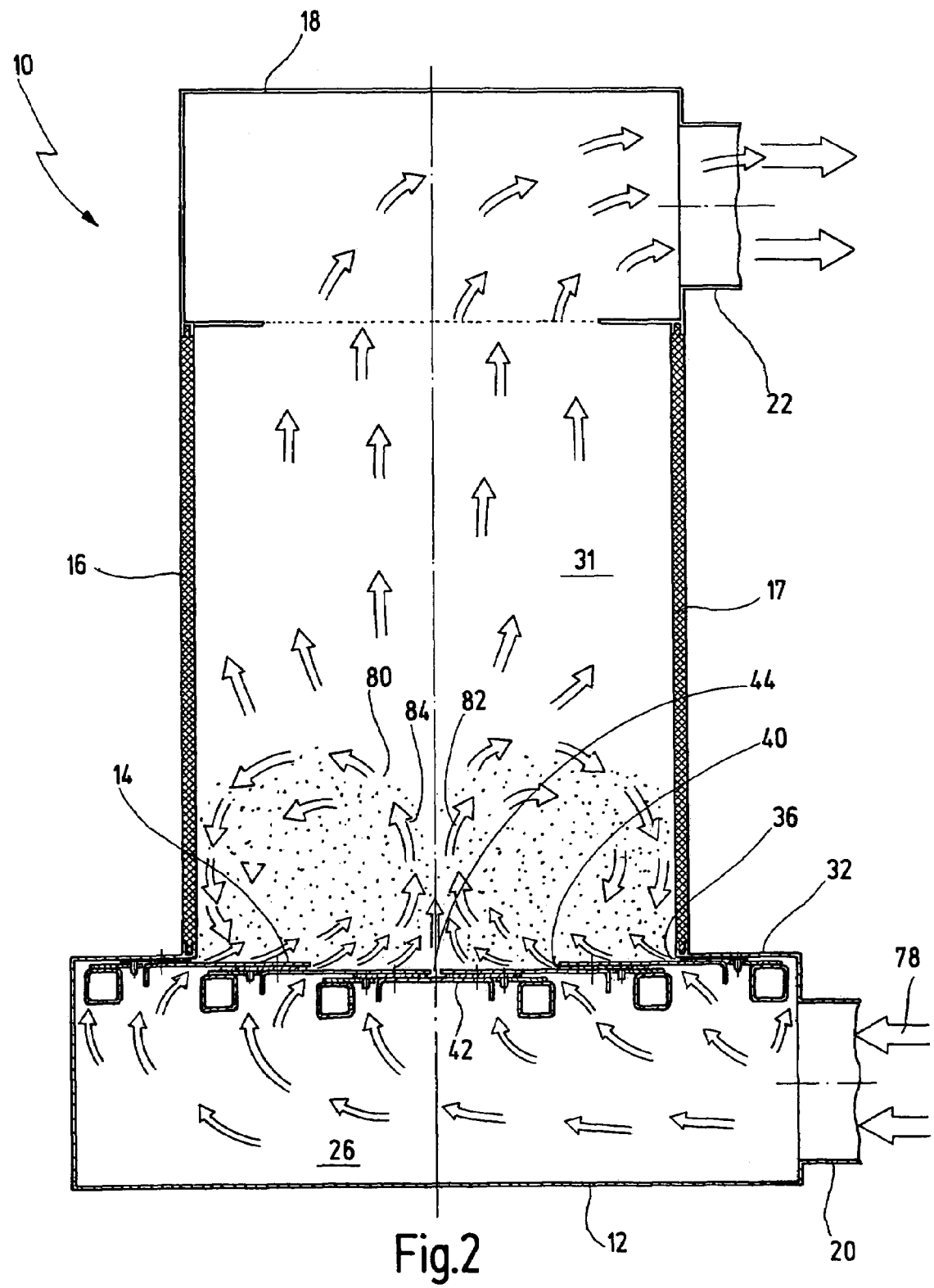
FIG. 2 shows a cross section of the apparatus of FIG. 1 along the line 11—11 in FIG. 1.
Figure 3:
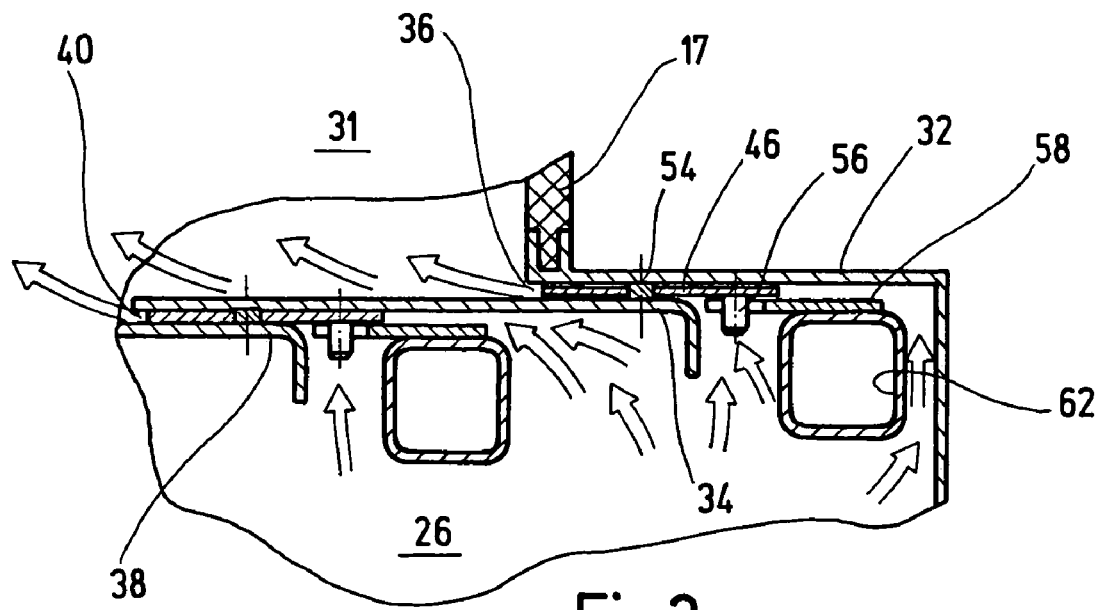
FIG. 3 shows a further enlarged illustration of a portion of the section from FIG. 2 in the region of the right-hand end of the bottom.
Figure 4:
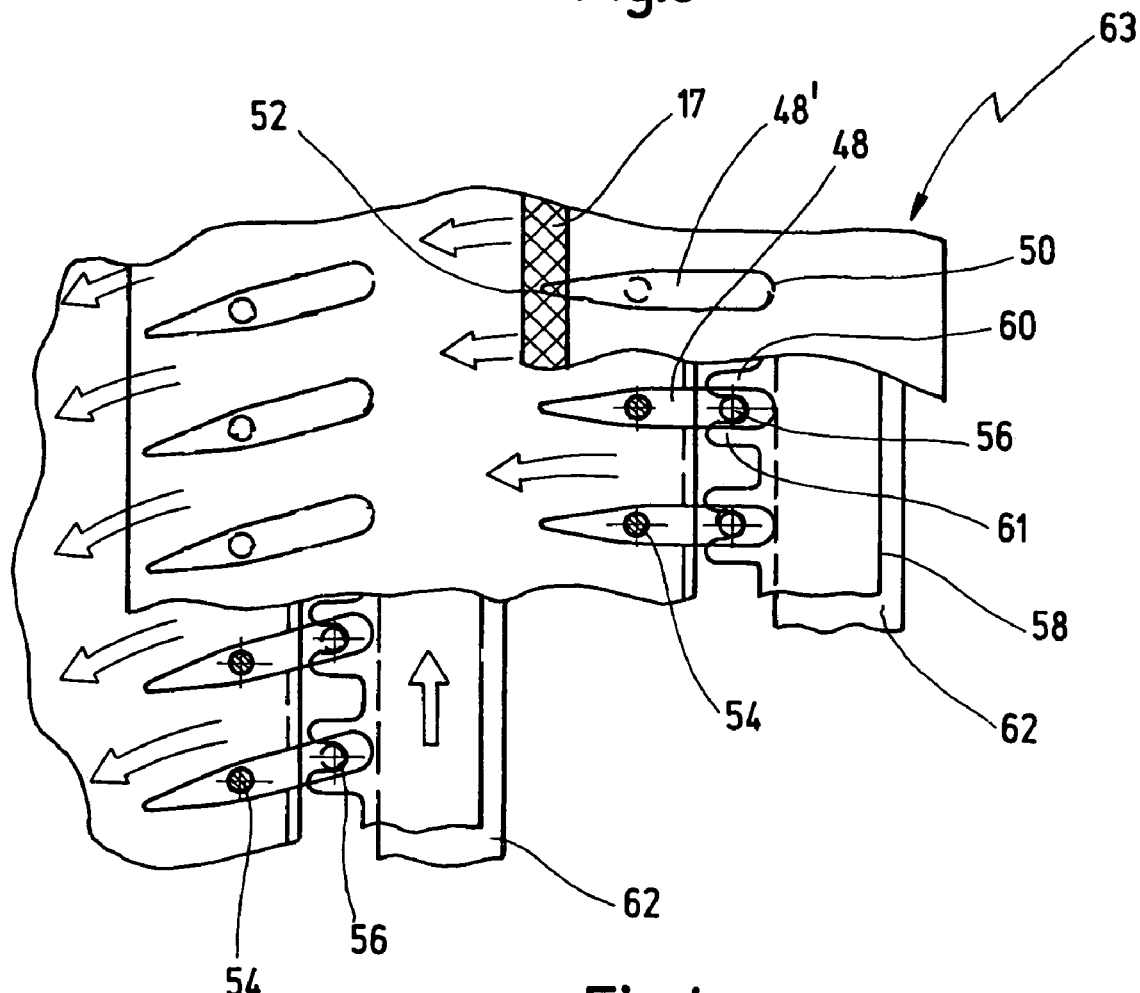
FIG. 4 shows a highly schematic, partly broken-open plan view of the bottom in this region.

The structure of the bottom 14 is to be explained in more detail in conjunction with FIGS. 2 to 4, FIG. 3 showing a highly enlarged portion of the section of FIG. 2 in its right-hand half.

It can thus be seen from FIG. 3 that there is a first guide plate 32 which extends approximately horizontally, is bent over downward at the side and is part of the feed air box 12. This guide plate also carries the upright side wall 17.

Arranged under the guide plate 32 is a further guide plate 34, the latter being such that the guide plate 32 located at the top overlaps the guide plate 34 located underneath.

Therefore, between these two guide plates 32 and 34, a gap is formed which opens in a slot 36, through which process air 78 from the air feed box 12 can enter the process chamber 31.

This slot 36 extends over the entire length of the process chamber 31 (see FIG. 5), to be specific at the lower end of the wall 17. This slot 36 ensures that no material settles in this corner, that is to say the latter is always blown free.

Arranged under the guide plate 34 is a further guide plate 38, specifically in such a way that the guide plate 34 located at the top overlaps to some extent the guide plate 38 located underneath. As a result, a further slot 40 is formed, which likewise again extends over the entire length of the process chamber 31, runs parallel with the slot 36 but is located further inward with respect to the latter (see FIG. 5).

Under the guide plate 38 there is a central guide plate 42, so that a further slot is formed, which extends exactly along the longitudinal center line of the process chamber 31.

As can be seen from the sectional illustration of FIG. 2, on the left-hand half there is again an identical, mirror-image guide plate arrangement.

If process air 78 is led through the bottom 14, as illustrated in FIG. 2, a central breaking-up zone 44 is produced, in which the two opposed flows 82 and 84 impinge on each other and are deflected upwards, as demonstrated by the flow arrows.

During operation, therefore, the process air 78 introduced through the feed air connection 20 flows into the corresponding chamber 26 in the feed air box 12, passes through the slots in the bottom 14, as a result of which the two oppositely oriented flows 82 and 84 running transversely with respect to the longitudinal direction 76 are formed. As a result, a material 80 to be treated and accommodated in the process chamber 31 is set in the transverse direction into two approximately circular, oppositely circulating vortices which rise in the region of the breaking-up zone 44, are then in each case deflected toward the inner side of the walls 16 and 17, are deflected downward at the walls, fall onto the bottom 14 again and are accelerated again in the direction of the central breaking-up zone 44 by means of the process air 78 passing through the bottom 14.

Using this swirling characteristic, the material 80 to be treated is swirled uniformly, so that an intensive interchange of energy between the process air 78 and the material 80 can take place. If this is to be a drying process, hot air is introduced as process air 78. In the process, the material particles 80 are heated to such an extent that moisture evaporates. Said moisture is carried along by the process air 78, led away upward and, via the waste air connection 22, is subjected to conditioning, for example dehumidification, reheating and subsequent feeding back.

In order then to superimpose on the swirled material particles 80 a movement component in the longitudinal direction 76, as can be seen in particular from FIGS. 3 and 4, air guide elements 46 are arranged between the guide plates. The plan view of FIG. 4 reveals that each air guide element 46 comprises a guide finger 48 which, on one side, has a rounded end 50 and, opposite this, an end 52 tapering to a point. Each guide finger 48 consists of a punched sheet metal or laser part. By means of a bearing pin 54, each guide finger 48 is held between two guide plates located one above another, this being illustrated in more detail in a representative manner in FIG. 3 for the guide element 46 between the upper guide plate 32 and the guide plate 34 located underneath. The bearing pin 54 can be used at the same time as a spacer for these two guide plates 32 and 34.

As can be seen in particular from FIG. 3, a stud 56 projects downward from the underside of the guide element 46 in the region of the rounded end 50 of the latter.

This stud 56 engages with two teeth 60 and 61 of a comb plate 58.

The comb plate 58 is connected to an actuating rod 62.

As can be seen from FIG. 4, a whole row of guide fingers 48 is arranged one after another, as viewed in the longitudinal direction 76, to be specific over the entire length of the process chamber 31. If, then, the actuating rod 62 is displaced in the longitudinal direction, as illustrated in the left-hand half of FIG. 4, the guide fingers 48 are pivoted, specifically all in the same direction and all to the same extent. As a result of the adjustment of the guide fingers 48, the process air 78 which passes between the plates 32 and 34 then has superimposed on it a corresponding movement component, oriented downward in the illustration of FIG. 4. There is thus only a single adjusting element 63 for a row of guide fingers 48.

Figure 5:
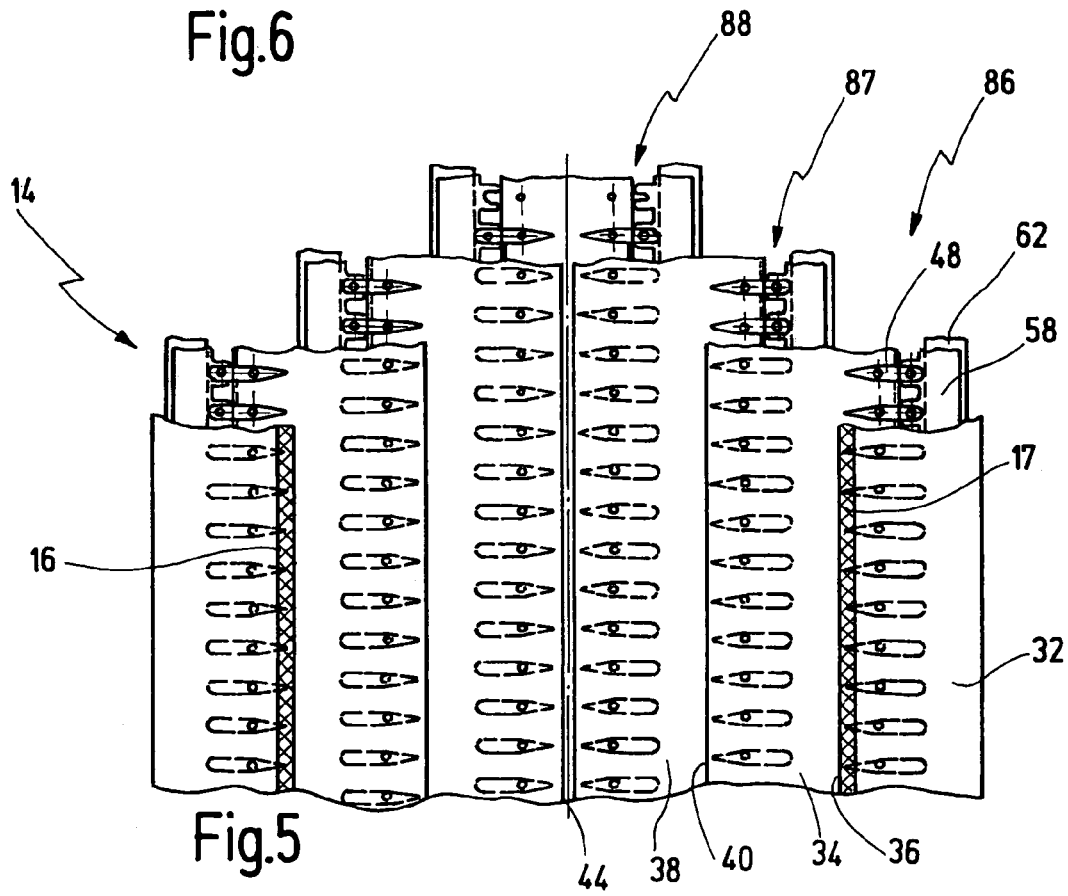
FIG. 5 shows a partly broken-open plan view of a portion of the bottom of the apparatus of FIG. 1, the groups of air guide elements being aligned such that the process air introduced has no movement component in the longitudinal direction superimposed on it.

The illustration of FIG. 5 reveals that, on both sides of the central breaking-up zone 44, there are three rows of guide fingers 48 ordered one behind another in the longitudinal direction, so that, in each half, there are three groups 86, 87 and 88 of such air guide elements. By means of appropriate adjustment or displacement of the actuating rods, each individual group 86, 87 and 88 can be adjusted individually.

For this purpose, each actuating element is provided at the outer end of the apparatus 10, see the illustration of FIG. 1, with an actuating wheel 68 which is accessible from the outside (here, only two outer actuating wheels 68 are illustrated), so that the respective pivoting setting of a row or group 86, 87 of each half can be adjusted individually. It can be seen in FIG. 1 that a transverse locking bar 66 is provided, which ensures that all the guide elements can be adjusted in the same direction and to the same extent, depending on what is desired.

Figure 6:
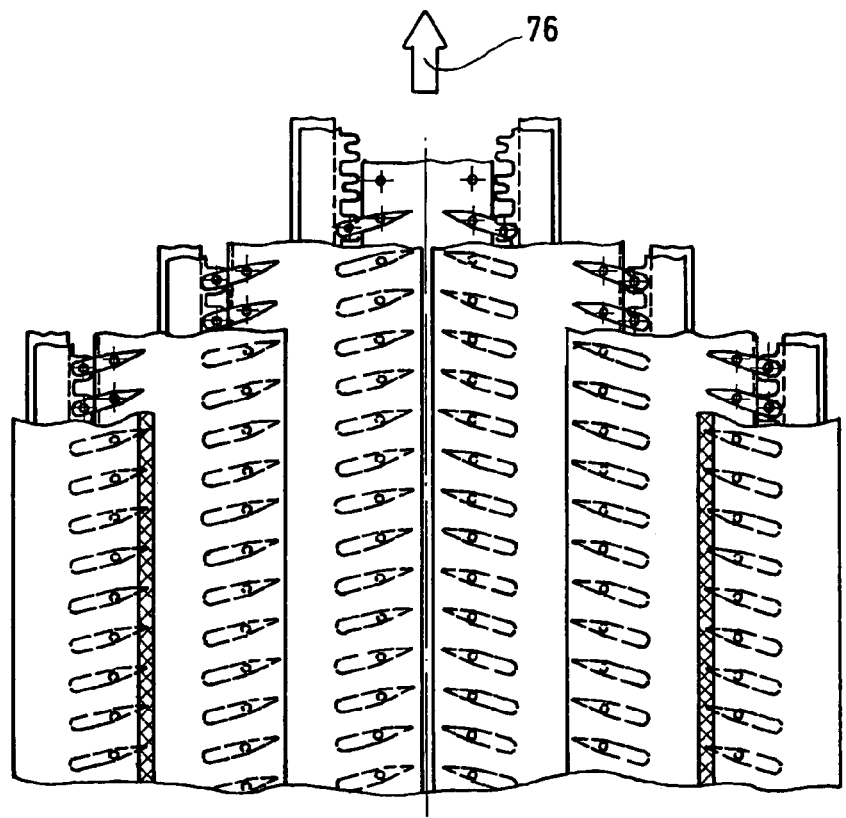
FIG. 6 shows an illustration corresponding to the illustration of FIG. 5, in which the air guide elements have been pivoted in such a way that the process air introduced has a movement component in the longitudinal direction superimposed on it.

Thus, for example as a result of actuation of the actuating wheels 68, all six groups can be pivoted from the position shown in FIG. 5 into the position shown in FIG. 6, as a result of which the process air 78 passing through then has superimposed on it a movement component in the longitudinal direction 76.

The assembly of guide fingers 48, comb plate 58, actuating rod 62 and actuating wheels 68 provides an adjustment device for superimposing a variable movement component to the process air in longitudinal direction of the process chamber.

In the exemplary embodiment illustrated, a group 86 extends over the entire length of the process chamber 31. It is now also possible to configure these groups such that they are subdivided individually in the longitudinal direction and can be adjusted differently.

During operation, it is possible, by controlling the amount of process air 78 supplied, in conjunction with the pivoting position of the air guide elements 46, to set an appropriate residence time of the swirled material particles 80 in the process chamber 31 individually and optimally.

Figure 7:
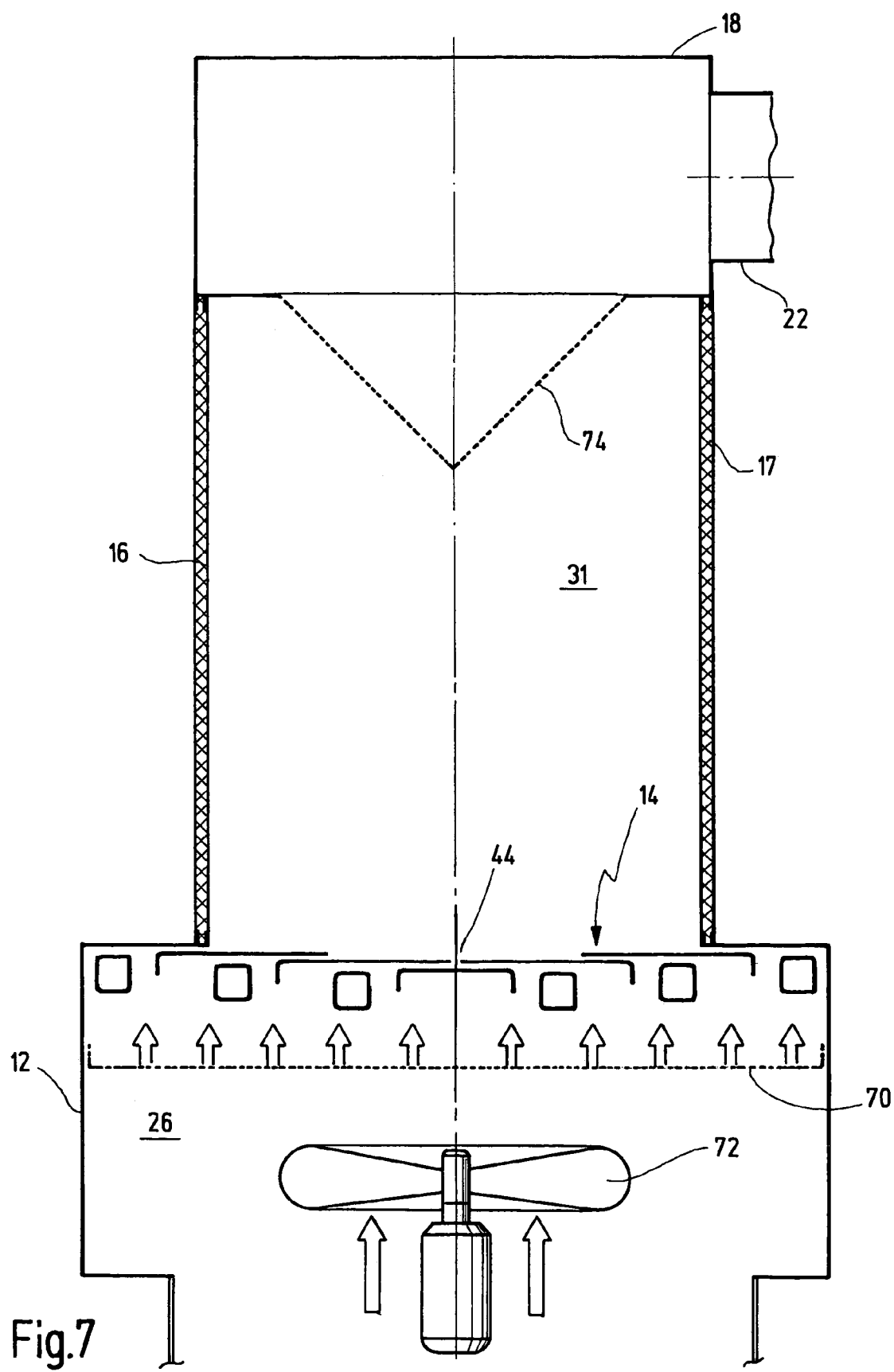
FIG. 7 shows a sectional illustration, comparable with the illustration of FIG. 2, of a further exemplary embodiment of an apparatus according to the invention.

FIG. 7 illustrates how the control can be individualized still further. In the feed air box 12, each individual chamber 26 is assigned a blower in the form of an axial fan 72, which can be activated individually in each case, so that each chamber can be supplied with a certain higher or lower amount of process air independently of the others. FIG. 7 further reveals that, between the axial fan 72 and the underside of the bottom 14, there is arranged an air distribution grid 70, which ensures that the air is supplied to the underside of the bottom 14 (which is merely illustrated very schematically here) so as to be distributed very uniformly. It also reveals that a filter 74 can be arranged in the process chamber 78, as illustrated only very schematically here, in order, in particular in the pharmaceutical sector, to retain valuable entrained floating substances in the process chamber 31.

If coating is to be carried out, appropriate spray nozzles can be employed. These can be arranged in the side walls 16 and/or 17 or else inserted as upright nozzles in the bottom 14, preferably in the region of the central breaking-up zone 44.

What is claimed is:

1. An apparatus for treating a particulate material, comprising
    an elongated, tunnel-like single process chamber having an inlet and an outlet, a material to be treated in said process chamber being moveable from said inlet to said outlet during a treatment,
    a bottom of said process chamber having overlapping horizontal guide plates forming slots there between extending in a longitudinal direction of said process chamber, said overlapping horizontal guide plates being superimposed in that a process air is introduced via said slots into said process chamber as two flows oriented transversely with respect to said longitudinal direction of said process chamber and said two flows being oriented oppositely toward each other, said two oppositely oriented flows impinging one another along a breaking-up zone,
    air guide elements arranged in said bottom, each of said air guide elements being pivotable in a generally horizontal plane about a generally vertical axis, and
    an adjustment device which pivots said air guide elements about the generally vertical axis about which each of said air guide elements is pivotable so as to adjust said air guide elements in such a way that a variable movement component in said longitudinal direction is superimposable on said process air for adjusting a longitudinal advance movement of said material passing said process chamber from said inlet to said outlet.

2. The apparatus of claim 1, wherein said air guide elements are arranged between said overlapping guide plates.

3. The apparatus of claim 1, wherein groups of said air guide elements are provided, each of said group of said guide elements can be adjusted independently to one another by said adjustment device.

4. The apparatus of claim 3, wherein a group has a row of air guide elements arranged one after another in said longitudinal direction.

5. The apparatus of claim 4, wherein air guide elements of one group can be adjusted by a common adjusting element of said adjustment device.

6. The apparatus of claim 5, wherein said adjusting elements of said groups can be individually adjusted by a control system of said adjustment device.

7. The apparatus of claim 1, wherein said air guide elements are designed as pivotable guide fingers.

8. The apparatus of claim 7, wherein a group of guide fingers is provided which group engages with an actuating rod of said adjustment device, a longitudinal displacement of said actuating rod causes the guide fingers of said group to be pivoted.

9. The apparatus of claim 8, wherein said actuating rod is comb-like, having teeth, said teeth of said actuating rod intermesh with a stud pin of a guide finger.

10. The apparatus of claim 9, wherein each guide finger can be pivoted about a bearing pin standing between two of said overlapping guide plates.

11. The apparatus of claim 1, wherein, below said bottom, there is arranged a feed-air box, which, as viewed in said longitudinal direction being subdivided into chambers by transverse walls.

12. The apparatus of claim 11, wherein air distribution grids are arranged in said chambers.

13. The apparatus of claim 1, wherein, below said bottom, there is arranged a feed air box, which, as viewed in the longitudinal direction, is subdivided into chambers by transverse walls, wherein each chamber is provided with an individual air feed.

14. The apparatus of claim 1, wherein, below the bottom, there is arranged a feed air box, which, as viewed in the longitudinal direction, is subdivided into chambers by transverse walls, wherein a blower is arranged in each of said chambers.

15. An apparatus for treating a particulate material, comprising
an elongated, tunnel-like process chamber having an inlet and an outlet, a material to be treated in said process chamber can be moved from said inlet to said outlet,
a bottom of said process chamber has overlapping guide plates forming slots there between extending in a longitudinal direction of said process chamber, said overlapping guide plates are superimposed in that a process air is introduced via said slots into said process chamber as two flows oriented transversely with respect to said longitudinal direction of said process chamber and said two flows being oriented oppositely toward each other, said two oppositely oriented flows impinge one another along a breaking-up zone,
air guide elements arranged in said bottom,
an adjustment device for adjusting said air guide elements in such a way that said process air can have superimposed on it a variable movement component in said longitudinal direction, and
wherein groups of said air guide elements are provided, each of said group of said guide elements can be adjusted independently to one another by said adjustment device.

16. The apparatus of claim 15, wherein a group has a row of air guide elements arranged one after another in said longitudinal direction.

17. The apparatus of claim 16, wherein air guide elements of one group can be adjusted by a common adjusting element of said adjustment device.

18. The apparatus of claim 17, wherein said adjusting elements of said groups can be individually adjusted by a control system of said adjustment device.

19. An apparatus for treating a particulate material, comprising
an elongated, tunnel-like process chamber having an inlet and an outlet, a material to be treated in said process chamber can be moved from said inlet to said outlet,
a bottom of said process chamber has overlapping guide plates forming slots there between extending in a longitudinal direction of said process chamber, said overlapping guide plates are superimposed in that a process air is introduced via said slots into said process chamber as two flows oriented transversely with respect to said longitudinal direction of said process chamber and said two flows being oriented oppositely toward each other, said two oppositely oriented flows impinge one another along a breaking-up zone,
air guide elements arranged in said bottom,
an adjustment device for adjusting said air guide elements in such a way that said process air can have superimposed on it a variable movement component in said longitudinal direction,
wherein said air guide elements are designed as pivotable guide fingers, and
wherein a group of guide fingers is provided which group engages with an actuating rod of said adjustment device, a longitudinal displacement of said actuating rod causes the guide fingers of said group to be pivoted.

20. The apparatus of claim 19, wherein said actuating rod is comb-like, having teeth, said teeth of said actuating rod intermesh with a stud pin of a guide finger.

21. The apparatus of claim 20, wherein each guide finger can be pivoted about a bearing pin standing between two of said overlapping guide plates.

* * * * *